US010779192B2

(12) United States Patent
Wu (10) Patent No.: US 10,779,192 B2
(45) Date of Patent: Sep. 15, 2020

(54) METHOD OF HANDLING CARRIER AGGREGATION AND RELATED COMMUNICATION DEVICE

(71) Applicant: HTC Corporation, Taoyuan (TW)

(72) Inventor: Chih-Hsiang Wu, Taoyuan (TW)

(73) Assignee: HTC Corporation, Taoyuan (TW)

( * ) Notice: Subject to any disclaimer, the term of this patent is extended or adjusted under 35 U.S.C. 154(b) by 0 days.

(21) Appl. No.: 16/048,319

(22) Filed: Jul. 29, 2018

(65) Prior Publication Data

US 2019/0045395 A1 Feb. 7, 2019

Related U.S. Application Data

(60) Provisional application No. 62/540,032, filed on Aug. 1, 2017.

(51) Int. Cl.
*H04W 28/06* (2009.01)
*H04W 76/27* (2018.01)
*H04W 72/04* (2009.01)
*H04L 5/00* (2006.01)
*H04W 76/10* (2018.01)
*H04W 74/08* (2009.01)
(Continued)

(52) U.S. Cl.
CPC ......... *H04W 28/065* (2013.01); *H04L 5/0048* (2013.01); *H04W 72/046* (2013.01); *H04W 74/002* (2013.01); *H04W 74/0833* (2013.01); *H04W 76/10* (2018.02); *H04W 76/27* (2018.02); *H04W 48/16* (2013.01)

(58) Field of Classification Search
CPC .................................................. H04W 28/065
See application file for complete search history.

(56) References Cited

U.S. PATENT DOCUMENTS

2015/0043490 A1* 2/2015 Wu .................. H04W 8/26 370/329
2015/0319778 A1* 11/2015 Folke ................ H04W 48/20 370/330
2016/0183323 A1 6/2016 Rahman
(Continued)

OTHER PUBLICATIONS

Search Report dated Dec. 12, 2018 for EP application No. 18186667. 4, pp. 1-5.

(Continued)

*Primary Examiner* — John D Blanton
(74) *Attorney, Agent, or Firm* — Winston Hsu (57) ABSTRACT

A base station connects to a communication device via a first cell, and transmits a radio resource control (RRC) message to the communication device via the first cell, wherein the RRC message configures a second cell to the communication device for a carrier aggregation and comprises a random access channel (RACH) configuration for the communication device to perform a random access (RA) to the second cell, the RACH configuration configures at least one RACH resource, and the RRC message configures an association configuration associating the at least one RACH resource with a first synchronization signal block or with a first channel state information reference signal transmitted via the second cell; receiving a RA preamble from the communication device via the second cell according to the at least one RACH resource.

8 Claims, 4 Drawing Sheets

(51) Int. Cl.
*H04W 74/00* (2009.01)
*H04W 48/16* (2009.01)

(56) References Cited

U.S. PATENT DOCUMENTS

| | | | |
|---|---|---|---|
| 2017/0006641 A1* | 1/2017 | Dinan | H04W 74/0833 |
| 2018/0324850 A1* | 11/2018 | Amuru | H04J 11/0073 |
| 2019/0274136 A1* | 9/2019 | Yerramalli | H04W 72/1231 |
| 2019/0288812 A1* | 9/2019 | Chen | H04B 7/0626 |

OTHER PUBLICATIONS

Huawei, HiSilicon, "RACH Procedures and Resource Configuration", 3GPP TSG RAN WG1 Meeting #88, R1-1701724, Feb. 13-17, 2017, Athens, Greece, XP051208890, pp. 1-7.
Guangdong OPPO Mobile Telecom, "NR 4-Step Random Access Procedure", 3GPP TSG RAN WG1 Meeting #89, R1-1707694, May 15-19, 2017, Hangzhou, P.R. China, XP051272900, pp. 1-5.
3GPP TS 38.331 V0.0.4, Jun. 2017.

* cited by examiner

METHOD OF HANDLING CARRIER AGGREGATION AND RELATED COMMUNICATION DEVICE

CROSS REFERENCE TO RELATED APPLICATIONS

This application claims the benefit of U.S. Provisional Application No. 62/540,032 filed on Aug. 1, 2017, which is incorporated herein by reference.

BACKGROUND OF THE INVENTION

1. Field of the Invention

The present invention relates to a communication device and a method used in a wireless communication system, and more particularly, to a communication device and a method of handling a carrier aggregation.

2. Description of the Prior Art

A base station (BS) may connect to a user equipment (UE) via a first cell of the BS, and may configure a second cell of the BS to the UE for a carrier aggregation (CA). However, the BS may not know which beam(s) operated by the second cell is used by the UE. Thus, beam-formed transmissions in the CA may not be performed properly and the benefit of the CA may be declined.

SUMMARY OF THE INVENTION

The present invention therefore provides a method and related communication device for handling a carrier aggregation to solve the abovementioned problem.

The method includes: A base station (BS) connecting to a communication device via a first cell belonging to the BS, and configuring a signaling radio bearer (SRB) to the communication device via the first cell; transmitting a radio resource control (RRC) message to the communication device on the SRB via the first cell, wherein the RRC message configures a second cell to the communication device for the CA and comprises a random access channel (RACH) configuration for the communication device to perform a random access (RA) to the second cell, the RACH configuration configures at least one RACH resource, and the RRC message configures an association configuration associating the at least one RACH resource with a first synchronization signal block (SSB) or with a first channel state information reference signal (CSI-RS) transmitted via the second cell; receiving a RRC response message for responding to the RRC message from the communication device on the SRB via the first cell; receiving a RA preamble from the communication device via the second cell according to the at least one RACH resource; transmitting a RA response (RAR) to the communication device in response to the RA preamble, wherein the RAR comprises a preamble identifier associated with the RA preamble; and communicating with the communication device via the second cell according to the RRC message.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
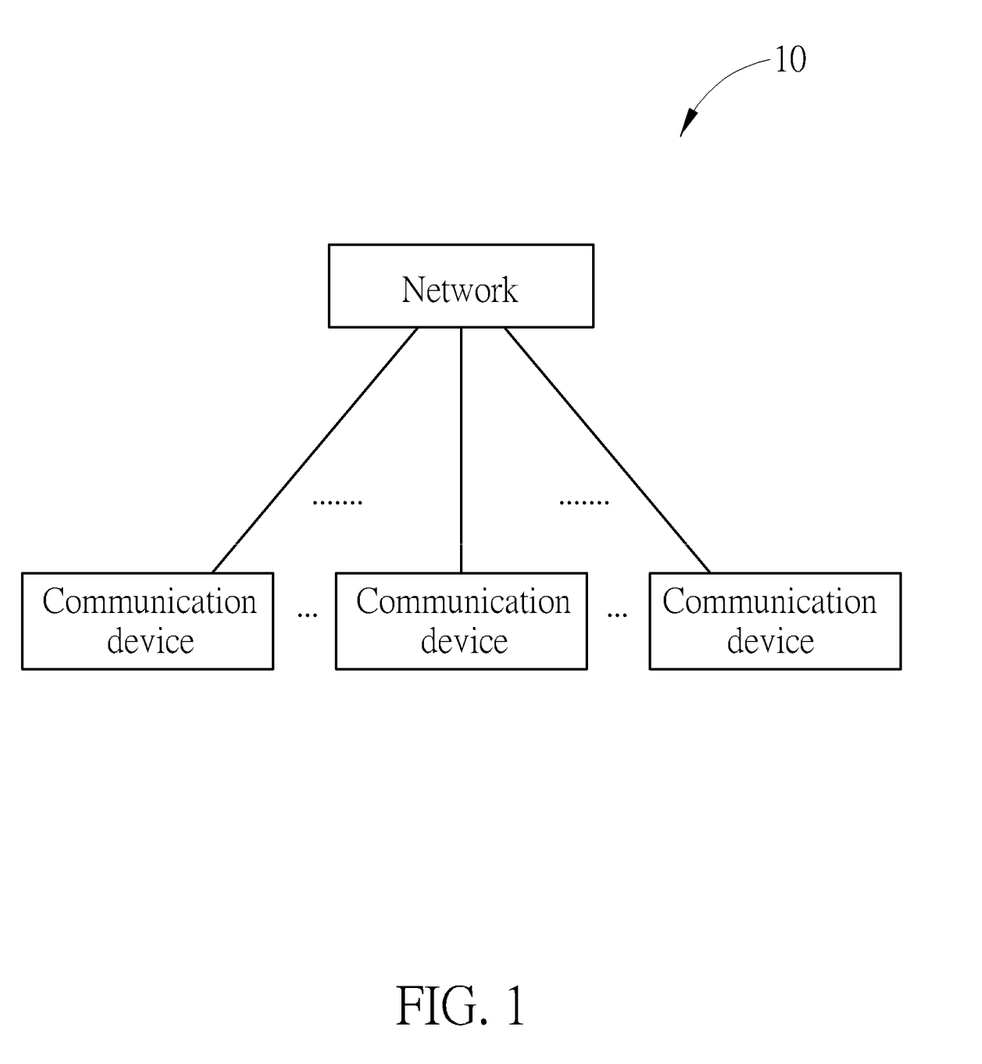
FIG. 1 is a schematic diagram of a wireless communication system according to an example of the present invention.

In FIG. 1, the wireless communication system 10 is briefly composed of a network and a plurality of communication devices. The network and the communication device may (e.g., simultaneously) communicate with each other via one or multiple cells including a primary cell (PCell) and one or more secondary cells (SCells).

Practically, the network in FIG. 1 may comprise a narrowband internet of things (NB-IoT) network or an evolved universal terrestrial radio access network (E-UTRAN) including at least one evolved Node-B (eNB). The network may comprise a new radio (NR)/next generation (NextGen) network including at least one 5G base station (BS) (or called gNB) or an evolved gNB (egNB) or a sixth generation (6G) BS. The 5G/6G radio communication technology may employ orthogonal frequency-division multiplexing (OFDM) and/or non-OFDM. In general, a BS may also be used to refer any of the eNB, the gNB, the egNB and the 6G BS.

A communication device may be a user equipment (UE), a NB-IoT UE, a mobile phone, a laptop, a tablet computer, an electronic book, a portable computer system, a vehicle, or an aircraft. In addition, the network and the communication device can be seen as a transmitter or a receiver according to direction (i.e., transmission direction), e.g., for a uplink (UL), the communication device is the transmitter and the network is the receiver, and for a downlink (DL), the network is the transmitter and the communication device is the receiver.

Figure 2:
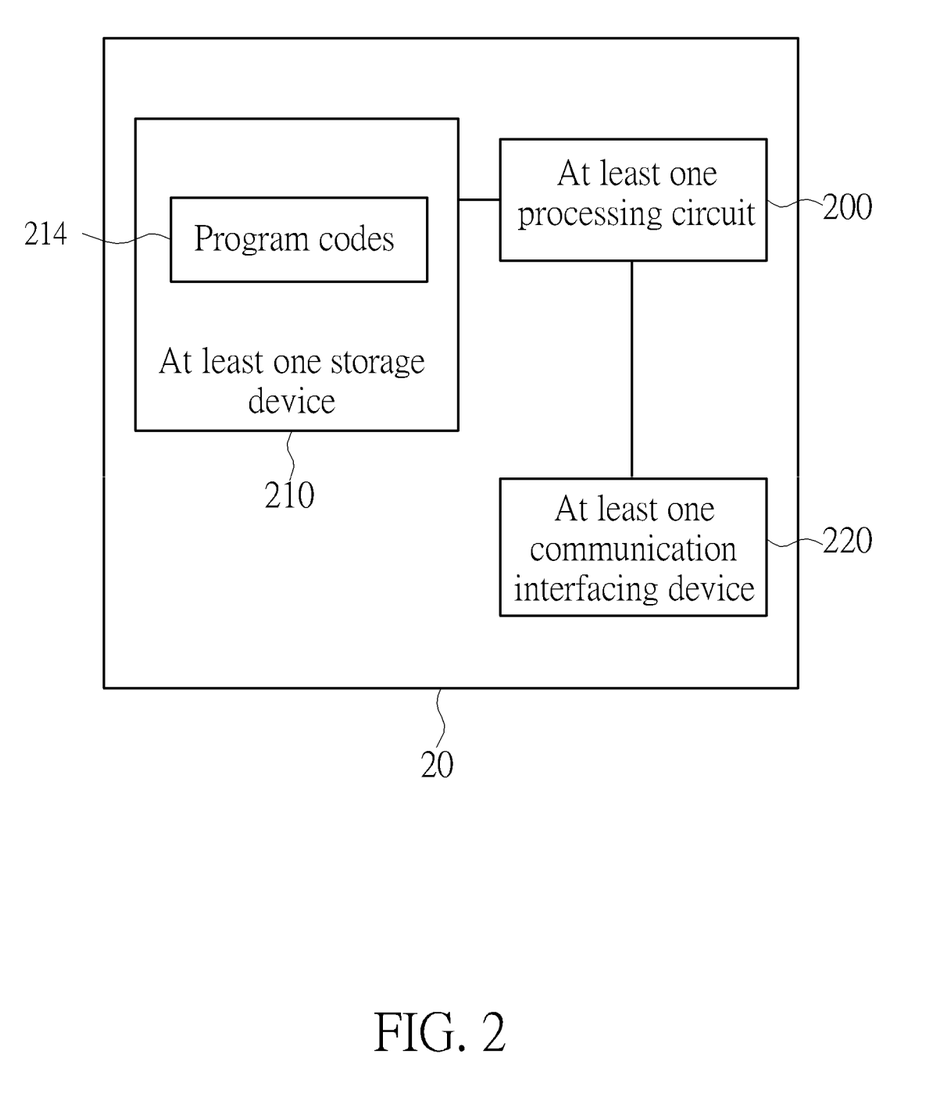
FIG. 2 is a schematic diagram of a communication device according to an example of the present invention.

In FIG. 2, the communication device 20 may be a communication device or the network shown in FIG. 1, but is not limited herein. The communication device 20 may include at least one processing circuit 200 such as a microprocessor or Application Specific Integrated Circuit (ASIC), at least one storage device 210 and at least one communication interfacing device 220. The at least one storage device 210 may be any data storage device that may store program codes 215, accessed and executed by the at least one processing circuit 200. Examples of the at least one storage device 210 include but are not limited to a subscriber identity module (SIM), read-only memory (ROM), flash memory, random-access memory (RAM), hard disk, optical data storage device, non-volatile storage device, non-transitory computer-readable medium (e.g., tangible media), etc. The at least one communication interfacing device 220 includes at least one transceiver and is used to transmit and receive signals (e.g., data, messages and/or packets) according to processing results of the at least one processing circuit 200.

In the following examples, a UE is used for representing the communication device in FIG. 1, to simplify the illustration of the embodiments.

Figure 3:
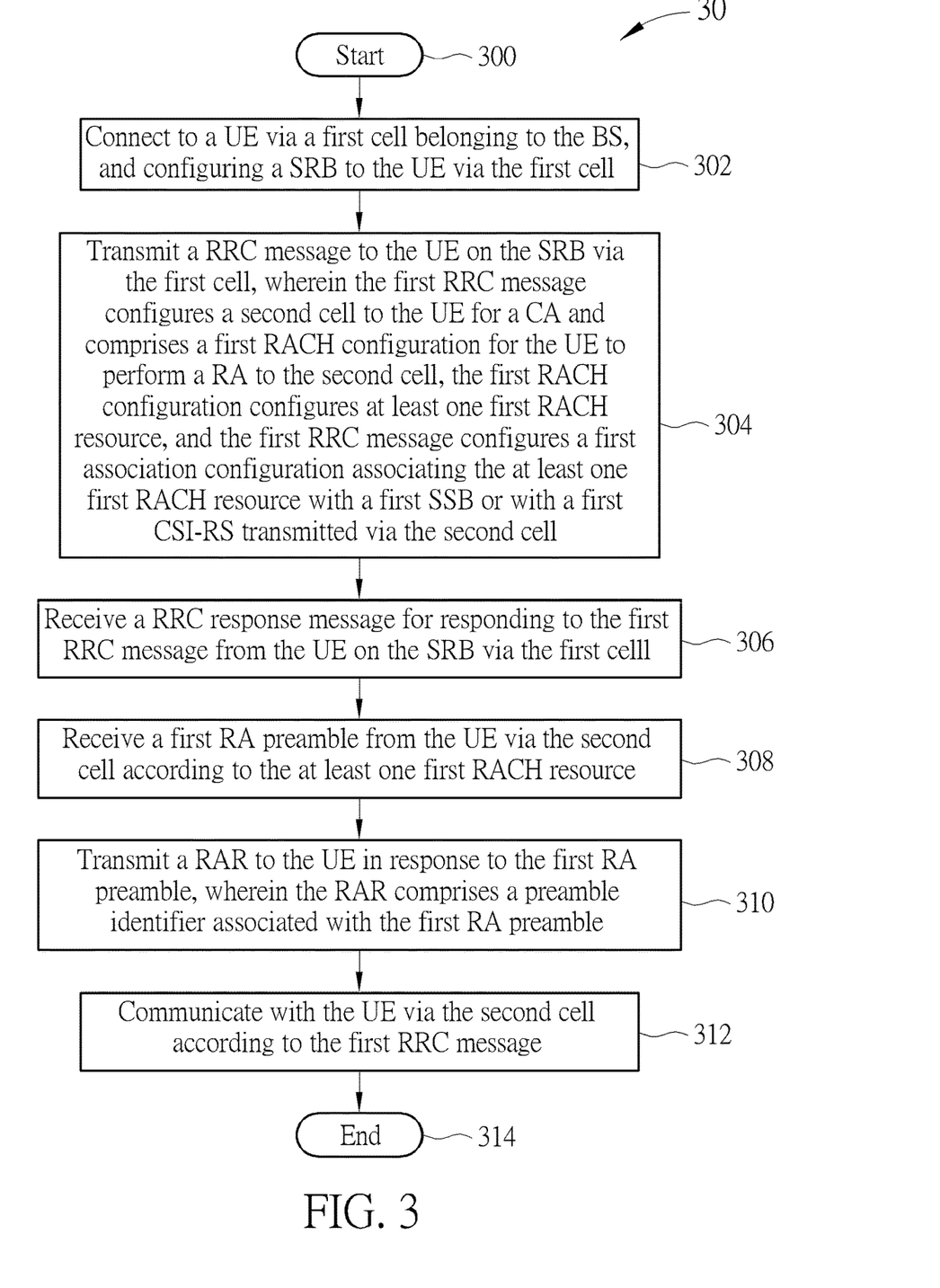
FIG. 3 is a flowchart of a process according to an example of the present invention.

A process 30 in FIG. 3 according to an example of the present invention may be utilized in a first BS (e.g., of the network in FIG. 1), and includes the following steps:

Step 300: Start.

Step 302: Connect to a UE via a first cell belonging to the BS, and configuring a signaling radio bearer (SRB) to the UE via the first cell.

Step 304: Transmit a radio resource control (RRC) message to the UE on the SRB via the first cell, wherein the first RRC message configures a second cell to the UE for a carrier aggregation (CA) and comprises a first random access channel (RACH) configuration for the UE to perform a random access (RA) to the second cell, the first RACH configuration configures at least one first RACH resource, and the first RRC message configures a first association configuration associating the at least one first RACH resource with a first synchronization signal block (SSB) or with a first channel state information reference signal (CSI-RS) transmitted via the second cell.

Step 306: Receive a RRC response message for responding to the first RRC message from the UE on the SRB via the first cell.

Step 308: Receive a first RA preamble from the UE via the second cell according to the at least one first RACH resource.

Step 310: Transmit a RA response (RAR) to the UE in response to the first RA preamble, wherein the RAR comprises a preamble identifier associated with the first RA preamble Step 312: Communicate with the UE via the second cell according to the first RRC message.

Step 314: End.

In one example, the first BS transmits (or broadcasts) the first SSB or the first CSI-RS to the UE via the second cell. When the first association configuration associates the at least one first RACH resource with the first CSI-RS instead of the first SSB, the first BS may or may not transmit the first SSB via the second cell. According to the first RA preamble received by the first BS, the first BS knows that the UE receives the first SSB or the first CSI-RS via the second cell.

In one example, the UE connects to the first BS via the second cell according to the first RRC message, while connecting to the first BS via the first cell. The first association configuration may be included in the first RACH configuration.

In response to the first RRC message, the UE may transmit the first RA preamble in (or on) the at least one first RACH resource via the second cell, when receiving (or detecting) the first SSB or the first CSI-RS. The first BS may receive the first RA preamble in (or on) one of the at least one first RACH resource.

In one example, the UE transmits the first RA preamble in (or on) the at least one first RACH resource via the first cell, when the first RRC message configures the second cell for a DL transmission and does not configure the second cell for a UL transmission. In one example, the UE transmits the first RA preamble in (or on) the at least one first RACH resource via the second cell, e.g., when the first RRC message configures the second cell for the DL transmission and the UL transmission. Accordingly, the first BS receives the first RA preamble from the UE in (or on) one of the at least one first RACH resource via the second cell.

In one example, the first BS transmits data to the UE via the second cell on at least one first transmit (Tx) beam associated with the first SSB or the first CSI-RS, in response to/according to the first RA preamble. That is, in response to the first RA preamble, the first BS transmits control signals (e.g., physical DL control channel (PDCCH)) and data (e.g., physical DL shared channel (PDSCH)) to the UE on the at least one first Tx beam.

In one example, the first BS transmits the RAR to the UE on a second Tx beam (e.g., narrow beam or wide beam) via the first cell. The second Tx beam may be neither associated with the first SSB nor the first CSI-RS. The second Tx beam may be associated with a second SSB or a second CSI-RS transmitted via the first cell.

In one example, the first BS transmits the RAR to the UE on a third Tx beam via the second cell. The third Tx beam may be associated with the first SSB or the first CSI-RS, or may be associated with a receive (Rx) beam for receiving the first RA preamble.

The first BS may perform transmissions via the first cell on a fourth plurality of Tx beams or on a fifth single Tx beam. The first BS may perform transmissions via the second cell on a sixth plurality of Tx beams. The fourth plurality of Tx beams may be the same as or different from the sixth plurality of Tx beams. One or more of the fourth plurality of Tx beams may be the same as one or more of the sixth plurality of Tx beams.

The at least one first RACH resource may include at least one of time resource(s) (e.g., which OFDM symbol(s), slot(s) or subframe(s)), frequency resource(s) (e.g., which physical resource block(s) (PRB(s)) or which subcarrier(s)) and the first RA preamble. When the first RA preamble is configured by the at least one first RACH resource, the first RA preamble may be a dedicated preamble. When the first RA preamble is not configured by the at least one first RACH resource, the first RA preamble may be selected by the UE from a first plurality of RA preambles. The first plurality of RA preambles may be configured in the first RACH configuration, configured in the first RRC message, predefined in a third Generation Partnership Project (3GPP) specification or configured in a system information block (SIB). The SIB may be included in the first RRC message or broadcasted by the first BS via the second cell.

In one example, the first BS transmits a first PDCCH order (e.g., DL control information (DCI)) to the UE via the second cell, when/after transmitting the first RRC message, receiving the first RRC response message or transmitting an activation command to the UE. The first PDCCH order may indicate the UE to use the first RA preamble, and triggers the UE to transmit the first RA preamble. For example, the first PDCCH order includes the preamble identifier associated with the first RA preamble.

The first BS may transmit the PDCCH order together with the first SSB or the first CSI-RS in a time unit. The first BS may transmit the PDCCH order together with a Tx beam associated with the first SSB or the first CSI-RS.

In one example, the first association configuration includes a SSB index of the first SSB or a CSI-RS index (or identifier/identity) of the first CSI-RS. In one example, the first RRC message or the first association configuration includes a CSI-RS configuration of the first CSI-RS. The CSI-RS configuration may configure at least one of time resources and frequency resources of the first CS-RS. The CSI-RS configuration may include a CSI-RS index identifying the first CSI-RS. The first BS may transmit the CSI-RS configuration to the UE in another RRC message, before transmitting the first RRC message.

In one example, the first RACH configuration includes at least one second RACH resource, and the first RRC message includes a second association configuration associating the at least one second RACH resource with a second SSB or a second CSI-RS transmitted via the second cell. The second association configuration may be included in the first RACH configuration. The at least one second RACH resource may include at least one of time resource(s) (e.g., which OFDM symbol(s), slot(s) or subframe(s)), frequency resources (e.g., which PRBs or which subcarrier(s)) and a second RA preamble. Then, the UE may determine to use the at least one first RACH resource instead of the at least one second RACH resource, when a signal strength of the first SSB (or the first CSI-RS) measured/received by the UE is better (e.g., greater) than a signal strength of the second SSB (or the second CSI-RS) measured/received by the UE. In another example, the first RRC message includes a second RACH configuration including the at least one second RACH resource and the second association configuration.

In the above examples, the UE may determine to use the at least one second RACH resource instead of the at least one first RACH resource, when a signal strength of the second SSB (or the second CSI-RS) measured/received by the UE is better (e.g., greater) than a signal strength of the first SSB (or the first CSI-RS) measured/received by the UE. In response to the determination, the UE may transmit the first RA preamble or a second RA preamble in (or on) the at least one second RACH resource. In one example, the second RA preamble is configured in the second RACH configuration and is associated with the at least one second RACH resource and/or the second SSB (or the second CSI-RS). In one example, the second RA preamble is selected from a second plurality of RA preambles or the first plurality of RA preambles. The second plurality of RA preambles may be configured in the first RRC message, configured in the second RACH configuration, predefined in the 3GPP specification or configured in a SIB. The SIB may be included in the first RRC message or broadcasted by the first BS via the second cell.

In one example, the first BS transmits a second PDCCH order (e.g., a DCI) to the UE via the second cell, when/after transmitting the first RRC message, receiving the first RRC response message or transmitting an activation command to the UE. The second PDCCH order may indicate the UE to use the second RA preamble, and triggers the UE to transmit the second RA preamble. For example, the second PDCCH order includes the preamble identifier associated with the second RA preamble.

The at least one second RACH resource may include at least one of time resource(s) (e.g., which OFDM symbol(s), slot(s) or subframe(s)) and frequency resource(s) (e.g., which PRB(s) or which subcarrier(s)) for the UE to perform a RA to the second cell. In one example, the second association configuration configures (or includes) a SSB index of the second SSB or a CSI-RS index of the second CSI-RS. In one example, the first RRC message or the second association configuration includes a CSI-RS configuration of the second CSI-RS. The CSI-RS configuration may configure at least one of time resources and frequency resources of the second CSI-RS. The CSI-RS configuration may include a CSI-RSI index identifying the second CSI-RS. The first BS may transmit the CSI-RS configuration to the UE in another RRC message, before transmitting the first RRC message.

In one example, the first BS determines the first association configuration according to a first measurement result from the UE. The first measurement result may include the signal strength of the first SSB or the signal strength of the first CSI-RS. For example, the first measurement result also includes the SSB index of the first SSB or the CSI-RS index of the first CSI-RS. The first BS may determine the second association configuration according to a second measurement result from the UE. The second measurement result may include a signal strength of the second SSB or a signal strength of the second CSI-RS. For example, the second measurement result also includes the SSB index of the second SSB or the CSI-RS index of the second CSI-RS.

Figure 4:
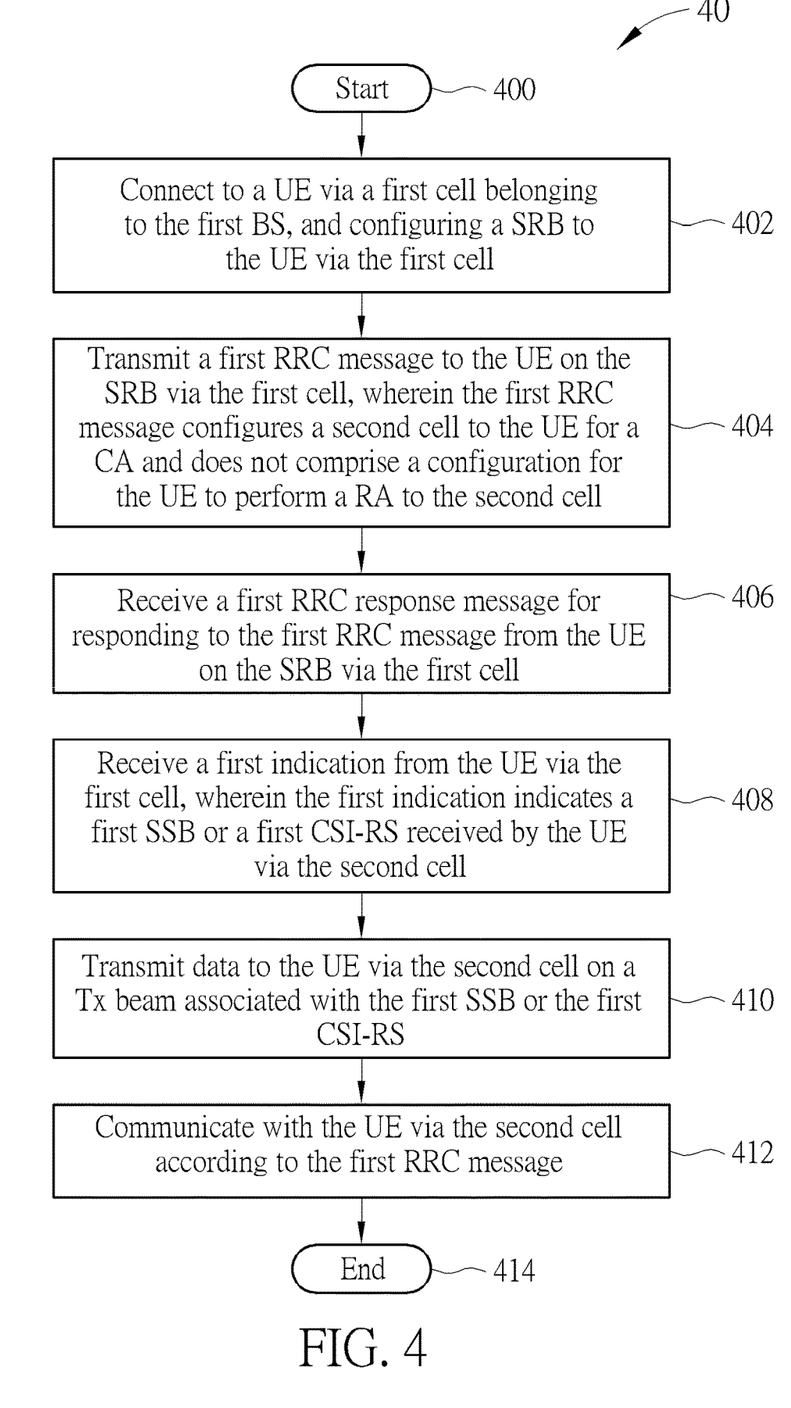
FIG. 4 is a flowchart of a process according to an example of the present invention.

A process 40 in FIG. 4 according to an example of the present invention may be utilized in a first BS (e.g., of the network in FIG. 1), and includes the following steps:

Step 400: Start.

Step 402: Connect to a UE via a first cell belonging to the first BS, and configuring a SRB to the UE via the first cell.

Step 404: Transmit a first RRC message to the UE on the SRB via the first cell, wherein the first RRC message configures a second cell to the UE for a CA and does not comprise a configuration for the UE to perform a RA to the second cell.

Step 406: Receive a first RRC response message for responding to the first RRC message from the UE on the SRB via the first cell.

Step 408: Receive a first indication from the UE via the first cell, wherein the first indication indicates a first SSB or a first CSI-RS received by the UE via the second cell.

Step 410: Transmit data to the UE via the second cell on a Tx beam associated with the first SSB or the first CSI-RS.

Step 412: Communicate with the UE via the second cell according to the first RRC message.

Step 414: End.

According to the process 40, the first BS knows that the UE receives the first SSB or the first CSI-RS via the second cell, and transmits data to the UE via the second cell on the Tx beam associated to the first SSB or the first CSI-RS. In one example, the first indication indicates (includes) information associated with the first SSB or the first CSI-RS. The information may include (or be) a measurement result of the second cell or a channel indicator (CQI) value of the second cell.

In one example, the first BS receives a second indication from the UE via the first cell. The second indication may indicate a second SSB or a second CSI-RS received by the UE via the second cell. In one example, the second indication indicates information associated with the second SSB or the second CSI-RS. The information may include (or be) a measurement result of the second cell or a CQI value of the second cell.

In one example, the first (or second) indication is transmitted on a PUCCH. In one example, the first (or second) indication is transmitted in a RS (e.g., sounding RS, demodulation RS or a specific RS). In one example, the first (or second) indication is transmitted in a physical UL shared channel (PUSCH). The PUSCH may include a Medium Access Control (MAC) Protocol Data Unit (PDU), a MAC Control Element, a Radio Link Control (RLC) PDU (e.g., a header of the RLC PDU), a PDCP PDU (e.g., a header of the PDCP PDU) or a RRC message.

In one example, the first indication and the second indication are in the same PUCCH message or different PUCCH messages. The first indication and the second indication are in the same RS or different RSs. The first indication and the second indication are in the same PUSCH or different PUSCHs.

In one example, the first RRC message configures a first plurality of UL radio resources (e.g., at least one of time resources and frequency resources) for the UE to transmit the first (or second) indication. Thus, the UE may transmit the first (or second) indication in the first plurality of UL radio resources. In one example, the first RRC message configures a message format for the UE to transmit the first (or second) indication in a first UL bandwidth part (BWP) or a second UL BWP. Thus, the UE may transmit the first (second) indication in the message format.

In one example, the first RRC message does not configure the at least one of time resources and the frequency resources for the UE to transmit the first (or second) indication via the second cell. Thus, the UE may transmit the first (or second) indication to the first BS on at least one of time resources and frequency resources via the first cell. The at least one of time resources and frequency resources may be configured for the PUCCH (if transmitted in the PUCCH), configured for the RS (if transmitted in the RS) or configured for the PUSCH (if transmitted in the PUSCH). In one example, the first BS transmits a second RRC message to the UE before transmitting the first RRC message, wherein the second RRC message configures a second plurality of UL radio resources for the UE to transmit the first (or second) indication in the second plurality of second UL resources. In another example, the at least one of time resources and frequency resources may be configured by a DCI transmitted on the PDCCH via the first cell.

Descriptions/examples for the process 30 may be applied to the process 40 and are not repeated herein.

The following examples may be applied to the above processes.

The first RRC message may include a cell identity (e.g., physical cell identity) of the second cell and an absolute radio-frequency channel number (ARFCN) indicating a first carrier frequency of the second cell (e.g., DL carrier frequency). The first RRC message may include a PDCCH configuration configuring at least one of time resources and frequency resources for a PDCCH on which the UE searches a DCI addressed to the UE. The first RRC message may configure a DL bandwidth for a DL communication with the UE. The first RRC message may configure a location of the DL bandwidth in the DL carrier frequency for the DL communication with the UE. The first RRC message may configure a UL bandwidth for a UL communication with the UE. The first RRC message may configure a location of the UL bandwidth in a UL carrier frequency for the UL communication with the UE.

The first RRC message may not configure a handover. In one example, the first RRC message may configure the second cell for the CA with the first cell. That is, the first BS aggregates carriers on the first cell and the second cell for data transmission to the UE and/or data transmission from the UE. The first cell and the second cell belong to the first BS, and the first BS generates the first RRC message. In the situation that the CA is in a node in dual connectivity, the first BS may be a master node (MN) or a secondary node (SN).

The first BS may transmit a measurement configuration to the UE via the first cell, before transmitting the first RRC message. The measurement configuration may configure the UE to perform a measurement on the second cell. The UE may transmit a measurement report including the first measurement result of the second cell according to/associated to the measurement configuration, and may indicate the first measurement result associated with the first SSB or the first CSI-RS. For example, the measurement report may include a SSB index of the first SSB or an identifier/identity/index of the first CSI-RS. The first BS may determine at least one of the first RACH configuration, the at least one first RACH resource and the first RA preamble according to the first measurement result. The first BS may determine the first plurality of RA preambles according to the first measurement result.

The measurement report may or may not include the second measurement result associated to the second SSB or the second CSI-RS, and may or may not indicate the second measurement result associated to the second SSB or the second CSI-RS. If the second measurement result is included, the first BS may determine at least one of the at least one second RACH resource and the second RA preamble according to the second measurement result. The first BS may determine the second plurality of RA preambles according to the second measurement result.

In the CA of the first cell and the second cell, the UE may receive data from the first BS via the first cell and the second cell simultaneously, or may transmit data to the first BS via the first cell and the second cell simultaneously. In the CA of the first cell and the second cell, the UE may be configured to transmit data to the first BS via the first cell, i.e., the CA is for a DL transmission but not for a UL transmission. The data includes a PUSCH transmission including a MAC PDU.

The first RRC message may be a NR RRC message (e.g., NR RRC Reconfiguration message). The first RRC response message may be a NR RRC response message (e.g., NR RRC Reconfiguration Complete message). The second RRC message may be a NR RRC message (e.g., NR RRC Reconfiguration message). The UE may transmit a second RRC response message (e.g., NR RRC Reconfiguration Complete message) to the first BS on the SRB via the first cell, in response to the second RRC message. The second RRC message may or may not configure a handover. When the second RRC message configures the handover, the UE may receive the second RRC message from the first BS (e.g., intra-BS handover) or from a second BS (e.g., inter-BS handover). When the second RRC message does not configure the handover, the UE may receive the second RRC message from the first BS.

The first BS may transmit the activation command to the UE via the first cell, in response to the first RRC message (i.e., configuring the second cell). The activation command may be used for ordering the UE to activate the second cell (e.g., ordering the UE to activate communication via the second cell). The first BS may transmit the PDCCH order, after transmitting the activation command. For example, the first BS transmits the activation command, when/after transmitting the first RRC message or receiving the first RRC response message. The activation command may be a MAC control element in a MAC PDU or may be a DCI. In one example, the first BS does not transmit the PDCCH order. In one example of the process 30, the UE may (start to) transmit the first (or second) RA preamble, when/after activating the second cell. In one example of the process 40, the UE may (start to) transmit the first (or second) indication, when/after activating the second cell.

In one example, the first BS does not transmit the activation command as described above. That is, the activation command is not needed to be defined. In one example, the first BS does not transmit the PDCCH orders above. In one example of the process 30, the UE transmits the first (or second) RA preamble, when/after/in response to synchronizing to the second cell in the DL transmission without the PDCCH orders above (i.e., in response to the first RRC message instead of the PDCCH orders above). In one example of the process 40, the UE may transmit the first (or second) indication, when/after/in response to synchronizing to the second cell in the DL transmission.

The SRB may be established for (e.g., directly) transmitting RRC messages between the UE and the first BS. In one example, the UE connects to the first BS (or the first BS may connect to the UE) by performing a RRC connection establishment procedure. In the RRC connection establishment procedure, the UE transmits a RRC Connection Request message to the first BS, and receives a RRC Connection Setup message from the first BS. When the UE receives the RRC Connection Setup message, the UE connects to the first BS. When the first BS transmits the RRC Connection Setup message, receives an acknowledgement message acknowledging the RRC connection Setup message or receives a RRC Connection Complete message responding the RRC Connection Setup message from the UE, the first BS connects to the UE.

In one example, the UE connects to the first BS (or the first BS may connect to the UE) by performing a handover procedure initiated by the second BS. The second BS may transmit a handover command (e.g., a NR RRC message) to the UE to initiate the handover procedure. When the first BS receives a handover complete message from the UE, the first BS connects to the UE. When the UE transmits the handover complete message (e.g., a NR RRC response message) to the first BS, the UE connects to the first BS.

The RACH configuration above may include at least one information element (IE).

The time resource(s) mentioned above may be formed by a plurality of OFDM symbols, slot(s), mini-slot(s) or subframe(s). The PRB may include a plurality of subcarriers (e.g., 12 or 24 subcarriers). The at least one first RACH resource and the at least one second RACH resource may be different. The first SSB and the second SSB may be different. The first CSI-RS and the second CSI-RS may be different. The at least one first RACH resources comprise a RACH resource or a plurality of RACH resources. The at least one second RACH resources comprise a RACH resource or a plurality of RACH resources.

In one example, the first BS receives a first UE capability of the UE from the UE, a core network or the second BS. The first UE capability may be related to a beamforming capability (e.g., a beam correspondence is supported or not) or a RA capability. The first BS may determine the RACH resources above (i.e., a content of the RACH resources above) according to the first UE capability. In one example, the first BS receives a second UE capability of the UE from the UE, the core network or the second BS. The second UE capability may be related to a CSI-RS receiving capability (e.g., a CSI-RS is supported or not). The first BS may determine that the RACH resources above are associated with the CSI-RS, when the second UE capability indicates that the CSI-RS is supported. The first BS may determine that the RACH resources above are associated with the SSB, when the second UE capability indicates that the CSI-RS is not supported.

The "determine" described above may be replaced by "select" or "obtain". The "according to" described above may be replaced by "in response to". The "associated with" described above may be replaced by "of" or "corresponding to". The "via" described above may be replaced by "on".

Those skilled in the art should readily make combinations, modifications and/or alterations on the abovementioned steps, description and examples. Some steps described above may not be necessary for realizing the present invention. The abovementioned description, steps and/or processes including suggested steps can be realized by means that could be hardware, software, firmware (known as a combination of a hardware device and computer instructions and data that reside as read-only software on the hardware device), an electronic system, or combination thereof. An example of the means may be the communication device 20. Any of the processes above may be compiled into the program codes 214. For the process(es) involving the first BS and second BS, the steps performed by the first BS may be compiled into the program codes 214 of the first BS and the steps performed by the second BS may be compiled into the program codes 214 of the second BS.

To sum up, the present invention provides a method and related communication device for handling beam-formed transmissions in a CA. A BS knows which beam(s) operated by a cell in the CA is used by a UE according to a RA preamble or an indication received from the UE. Thus, the problem of handling the CA is solved.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A base station (BS) for handling a carrier aggregation, comprising:
   at least one storage device; and
   at least one processing circuit, coupled to the at least one storage device, wherein the at least one storage device stores, and the at least one processing circuit is configured to execute instructions of:
   connecting to a communication device via a first cell belonging to the BS, and configuring a signaling radio bearer (SRB) to the communication device via the first cell;
   transmitting a radio resource control (RRC) message to the communication device on the SRB via the first cell, wherein the RRC message configures a second cell to the communication device for the carrier aggregation and comprises a random access channel (RACH) configuration for the communication device to perform a random access (RA) to the second cell, the RACH configuration configures at least one RACH resource, and the RRC message configures an association configuration associating the at least one RACH resource with a first synchronization signal block (SSB) or with a first channel state information reference signal (CSI-RS) transmitted via the second cell;
   receiving a RRC response message for responding to the RRC message from the communication device on the SRB via the first cell;
   receiving a RA preamble from the communication device via the second cell according to the at least one RACH resource;
   transmitting a RA response (RAR) to the communication device in response to the RA preamble, wherein the RAR comprises a preamble identifier associated with the RA preamble;
   communicating with the communication device via the second cell according to the RRC message; and
   transmitting the RAR to the communication device on a first transmit (Tx) beam via the second cell, and the first Tx beam is associated with the first SSB or the first CSI-RS, or is associated with a receive (Rx) beam for receiving the RA preamble.

2. The BS of claim 1, wherein the instructions further comprise:
   transmitting the first SSB or the first CSI-RS to the communication device via the second cell.

3. The BS of claim 1, wherein the instructions further comprise:
   receiving the RA preamble from the communication device on at least one of the at least one RACH resource via the second cell.

4. The BS of claim 1, wherein the instructions further comprise:
   transmitting data to the communication device via the second cell on at least one second Tx beam associated with the first SSB or the first CSI-RS, in response to the RA preamble.

5. The BS of claim 1, wherein the instruction of transmitting the RAR to the communication device further comprises:
   transmitting the RAR to the communication device on a third Tx beam via the first cell, and the third Tx beam is associated with a second SSB or a second CSI-RS transmitted via the first cell.

6. The BS of claim 1, wherein the instructions further comprise:
   transmitting a physical DL control channel (PDCCH) order to the communication device via the second cell, when transmitting the RRC message, receiving the RRC response message or transmitting an activation command to the communication device.

7. The BS of claim 1, wherein the instructions further comprise:
   transmitting a measurement configuration to the communication device via the first cell before transmitting the RRC message, wherein the measurement configuration configures the communication device to perform a measurement on the second cell; and
   receiving a measurement result of the second cell.

8. The BS of claim 7, wherein the instructions further comprise:
   determining at least one of the RACH configuration, the at least one RACH resource and the RA preamble according to the measurement result.

* * * * *